(12) United States Patent
Komori et al.

(10) Patent No.: US 11,535,066 B2
(45) Date of Patent: Dec. 27, 2022

(54) TIRE

(71) Applicant: Sumitomo Rubber Industries, Ltd., Kobe (JP)

(72) Inventors: Yosuke Komori, Kobe (JP); Hiroshi Yamaoka, Kobe (JP); Yuta Sakakibara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 282 days.

(21) Appl. No.: 16/879,968

(22) Filed: May 21, 2020

(65) Prior Publication Data

US 2020/0376899 A1   Dec. 3, 2020

(30) Foreign Application Priority Data

May 31, 2019   (JP) ............................. JP2019-102092
May 31, 2019   (JP) ............................. JP2019-102094

(51) Int. Cl.
*B60C 11/13* (2006.01)
*B60C 11/04* (2006.01)
*B60C 11/03* (2006.01)

(52) U.S. Cl.
CPC ............. *B60C 11/13* (2013.01); *B60C 11/04* (2013.01); *B60C 2011/0339* (2013.01)

(58) Field of Classification Search
CPC ............. B60C 11/0304; B60C 11/0306; B60C 11/0309; B60C 11/0302; B60C 2011/0369
See application file for complete search history.

(56) References Cited

U.S. PATENT DOCUMENTS

| | | | | |
|---|---|---|---|---|
| 2012/0168050 | A1* | 7/2012 | Terashima | B60C 11/0306 152/209.25 |
| 2014/0190606 | A1* | 7/2014 | Takemoto | B60C 11/0304 152/209.8 |
| 2016/0297251 | A1* | 10/2016 | Takagi | B60C 11/0304 |
| 2017/0050470 | A1* | 2/2017 | Kanematsu | B60C 11/0304 |
| 2020/0290405 | A1* | 9/2020 | Oda | B60C 11/0304 |

FOREIGN PATENT DOCUMENTS

JP        2015-120380 A        7/2015

* cited by examiner

*Primary Examiner* — Robert C Dye
*Assistant Examiner* — Brendon Charles Darby
(74) *Attorney, Agent, or Firm* — Birch, Stewart, Kolasch & Birch, LLP (57) ABSTRACT

A tire comprises a tread portion axially divided into four land regions. The tire has a mounting direction to a vehicle and the land regions 4 include a widest outboard middle land region. The outboard middle land region is provided with first, second and third inclined grooves. The first inclined groove extends from a crown main groove and terminates within the outboard middle land region. The second inclined groove has its both ends terminated within the outboard middle land region. The third inclined groove intersects the first and second inclined grooves.

20 Claims, 7 Drawing Sheets

TIRE

TECHNICAL FIELD

The present invention relates to a tire, more particularly to a tire having a tread portion axially divided into four land regions.

BACKGROUND ART

Japanese Patent Application Publication No. 2015-120380 (Patent Document 1) discloses a tire having a tread portion for which a mounting direction to a vehicle is specified. In this tread portion, there are formed an outboard shoulder land region, an outboard middle land region, an inboard middle land region, and an inboard shoulder land region. And the arrangement of grooves disposed in the outboard middle land region is specifically defined with the view to improvement in snow performance, while suppressing a decrease in the rigidity of the outboard middle land region.

SUMMARY OF THE INVENTION

Problems to be Solved by the Invention

In the tire of Patent Document 1, however, the outboard middle land region has a tendency that the lateral rigidity thereof becomes insufficient. This leads to deterioration in the steering stability on dry road surfaces. Therefore, the tire of Patent Document 1 is required to be improved in the steering stability on dry road surfaces.

The present invention was made in view of the above-described problems, and it is an objective of the present invention to proved a tire of which tread portion is axially divided into four land regions and which can exhibit excellent snow performance and steering stability on dry road surfaces.

According to one aspect of the present invention, a tire whose mounting direction to a vehicle is specified, comprises:
a tread portion having an outboard tread edge and an inboard tread edge to be located outboard and inboard of the vehicle, respectively, when the tire is mounted on the vehicle,
the tread portion provided, between the inboard tread edge and the outboard tread edge, with three main grooves,
the three main grooves extending continuously and circumferentially of the tire so that the tread portion is axially divided into four land regions,
the three main grooves including
an outboard shoulder main groove disposed between the outboard tread edge and the tire equator, and
a crown main groove disposed adjacently to the outboard shoulder main groove on the inboard tread edge side of the outboard shoulder main groove, and
the four land regions including an outboard middle land region defined between the outboard shoulder main groove and the crown main groove,
wherein
the axial width of the outboard middle land region is the largest among the four land regions,
the outboard middle land region is provided with first inclined grooves and second inclined grooves each inclined to a first direction with respect to the tire axial direction, and third inclined grooves inclined to a second direction with respect to the tire axial direction, the second direction being opposite to the first direction,
the first inclined grooves extend from the crown main groove and are terminated within the outboard middle land region,
each of the second inclined grooves has its both ends terminated within the outboard middle land region, and
one of the third inclined grooves is connected to one of the first inclined grooves and one of the second inclined grooves.

In this application, when a groove is referred as being connected to another groove, it is intended to mean either the two grooves intersecting each other to form a cross junction, or the two grooves one of which meets the other without intersecting to form a T or Y junction.

According to another aspect of the present invention, a tire whose mounting direction to a vehicle is specified, comprises:
a tread portion having an outboard tread edge and an inboard tread edge to be located outboard and inboard of the vehicle, respectively, when the tire is mounted on the vehicle,
the tread portion provided, between the inboard tread edge and the outboard tread edge, with three main grooves,
the three main grooves extending continuously and circumferentially of the tire so that the tread portion is axially divided into four land regions,
the three main grooves including
an outboard shoulder main groove disposed between the outboard tread edge and the tire equator, and
a crown main groove disposed adjacently to the outboard shoulder main groove on the inboard tread edge side of the outboard shoulder main groove, and
the four land regions including an outboard middle land region defined between the outboard shoulder main groove and the crown main groove,
wherein
the axial width of the outboard middle land region is the largest among the four land regions,
the outboard middle land region is provided with first inclined grooves and second inclined grooves each inclined to a first direction with respect to the tire axial direction,
the first inclined grooves extend from the crown main groove and are terminated within the outboard middle land region,
each of the second inclined grooves has its both ends terminated within the outboard middle land region, and
the depth of each of the second inclined grooves is smaller in its end portion on the crown main groove side than its other portion.

It is preferable that the groove width of each of the first inclined grooves decreases from the crown main groove toward the outboard shoulder main groove.

It is preferable that the groove width of each of the second inclined grooves decreases from its outboard shoulder main groove side to its crown main groove side.

It is preferable that the groove width of the third inclined groove is gradually decreased at least from the first inclined groove to the second inclined groove.

It is preferable that the groove width of each of the first inclined grooves decreases from the crown main groove toward the outboard shoulder main groove.

It is preferable that the groove width of each of the second inclined grooves decreases from its outboard shoulder main groove side to its crown main groove side.

It is preferable that
the groove width of the first inclined grooves decreases from the crown main groove toward the outboard shoulder main groove, the groove width of the second inclined grooves decreases from its outboard shoulder main groove side to its crown main groove side, and
the groove width of the third inclined grooves gradually decreases at least from the first inclined groove to the second inclined groove.

It is preferable that each of the first inclined grooves, the second inclined grooves and the third inclined grooves is curved.

It is preferable that the depth of each of the first inclined grooves is smaller in its end portion on the outboard shoulder main groove side than its other portion.

It is preferable that the depth of each of the second inclined grooves is smaller in its end portion on the crown main groove side than its other portion.

It is preferable that the outboard middle land region is provided with a first sipe intersecting one of the first inclined grooves and an end portion on the crown main groove side of one of the second inclined grooves.

It is preferable that the outboard middle land region is provided with a second sipe intersecting one of the second inclined grooves and an end portion on the outboard shoulder main groove side of one of the first inclined grooves.

It is preferable that the depth of each of the third inclined grooves gradually increases from its end on the crown main groove side to its end on the outboard shoulder main groove side.

It is preferable that the second inclined grooves each comprise a communicating part connected to one of the third inclined grooves, and an inner part extending from the communicating part to an end on the crown main groove side of the second inclined groove, and
the depth of the inner part is smaller than other part of the second inclined groove.

It is preferable that the first inclined grooves each comprises a communicating part connected to one of the third inclined grooves, and an outer part extending from the communicating part to an end on the outboard shoulder main groove side of the first inclined groove, and
the depth of the outer part is smaller than other part of the first inclined groove.

It is preferable that the depth of the above-said outer part of the first inclined groove gradually decreases toward an end on the outboard shoulder main groove side of the first inclined groove.

It is preferable that the first inclined grooves extend across the axial center line of the outboard middle land region.

It is preferable that an angle of each of the first inclined grooves with respect to the tire circumferential direction is gradually decreased from the crown main groove toward the outboard shoulder main groove.

It is preferable that the second inclined grooves extend across the axial center line of the outboard middle land region.

It is preferable that the length in the tire axial direction of each of the second inclined grooves is smaller than the length in the tire axial direction of each of the first inclined grooves.

DESCRIPTION OF THE PREFERRED EMBODIMENTS

The present invention can be applied to various tiers such as pneumatic tires as well as non-pneumatic tires so called airless tire, for various vehicles. e.g. a passenger car and a heavy-duty vehicle such as truck and bus and the like.

Hereinafter, taking a pneumatic tire for a passenger car as an example, embodiments of the present invention will be described in detail conjunction with accompanying drawings.

Figure 1:
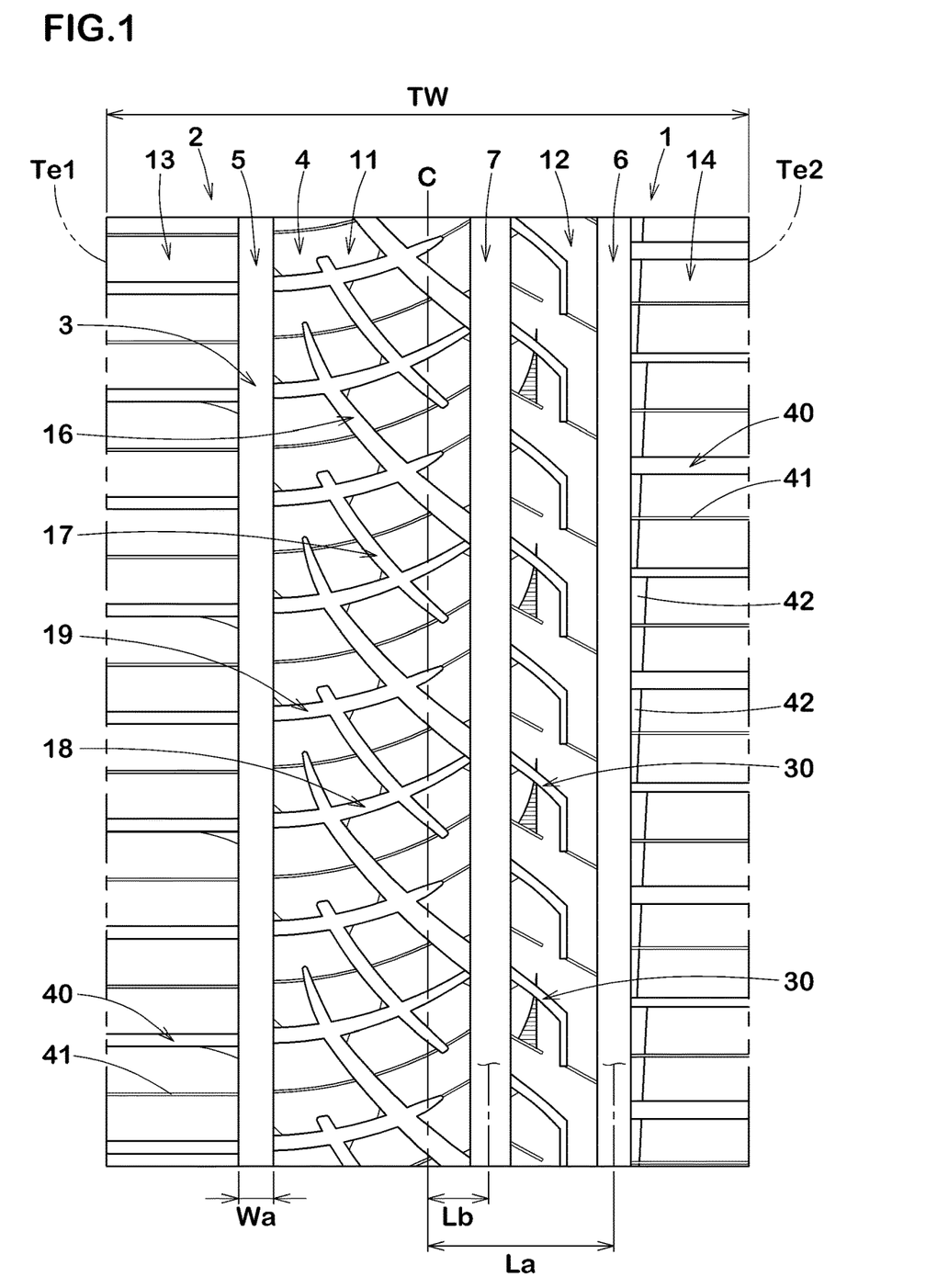
FIG. 1 is a developed partial view of the tread portion of a tire as an embodiment of the present invention.

FIG. 1 shows a part of the tread portion 2 of a pneumatic tire 1 as an embodiment of the present invention.

As well known in the art, a pneumatic tire comprises a tread portion 2 whose radially outer surface defines the tread surface, a pair of axially spaced bead portions mounted on rim seats, a pair of sidewall portions extending between the tread edges and the bead portions, a carcass extending between the bead portions through the tread portion and the sidewall portions, and a tread reinforcement disposed radially outside the carcass in the tread portion.

The tread edges are the axial outermost edges of the ground contacting patch of the tire which occurs under a normally loaded condition when the camber angle of the tire is zero.

The tread width TW is the width measured under a unloaded condition, as the axial distance between the tread edges determined as above.

The unloaded condition of a pneumatic tire is such that the tire is mounted on a standard wheel rim and inflate to a standard pressure but loaded with no tire load.

The normally loaded condition of a pneumatic tire is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of a pneumatic tire refer to those under the unloaded condition of the tire unless otherwise noted.

According to the present invention, the tread portion 2 of the tire is provided with a tread pattern of left-right asymmetry (asymmetry about the tire equator C). An example is shown in FIG. 1.

Thus, the mounting position of the tire with respect to a vehicle is specified. For example, the sidewall portion (not shown) of the tire to be located on outside when installed on the vehicle is provided with an indication representing "outside", and the sidewall portion (not shown) to be located on inside is provided with an indication representing "inside".

The above-said tread edges of the tread portion 2 are an outboard tread edge Te1 to be positioned away from the center of the vehicle body and an inboard tread edge Te2 to be positioned close to the center of the vehicle body.

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

In order to form the tread pattern, the tread portion 2 is provided, between the outboard tread edge Te1 and the inboard tread edge Te2, with three main grooves 3 extending continuously and circumferentially of the tire. Thereby, the tread portion 2 is axially divided into four annular land regions 4.

The three main grooves 3 are
an outboard shoulder main groove 5 disposed between the outboard tread edge Te1 and the tire equator C,
an inboard shoulder main groove 6 disposed between the inboard tread edge Te2 and the tire equator C, and
a crown main groove 7 disposed between the outboard shoulder main groove 5 and the inboard shoulder main groove 6.

Preferably, the axial distance La from the widthwise center line of the outboard shoulder main groove 5 to the tire equator C is set in a range from 0.20 to 0.35 times the tread width TW.

Preferably, the axial distance La from the widthwise center line of the inboard shoulder main groove 6 to the tire equator C is set in a range from 0.20 to 0.35 times the tread width TW.

Preferably, the axial distance Lb from the widthwise center line of the crown main groove 7 to the tire equator C is set in a range from 0 to 0.15 times the tread width TW. In the present embodiment, the crown main groove 7 is disposed on the inboard tread edge Te2 side of the tire equator C. Namely, the axial distance Lb is more than 0 times the tread width TW.

In the present embodiment, each of the main grooves 3 is a straight groove extending parallel with the tire circumferential direction. However, one of or each of the main grooves 3 may be a wavy or zigzag groove.

Preferably, the groove width wa of each of the main grooves 3 is set in a range from 4.0% to 7.0% of the tread width TW. And the groove width wa is at least 3.0 mm. Thus, a narrow groove whose groove width is less than 3.0 mm is not included in the main grooves 3.

Here, the term "groove width" of a groove means a distance measured between the groove edges in a direction orthogonal to the widthwise center line of the groove.

In the case of a pneumatic tire for a passenger car, the depth of each of the main grooves 3 is preferably set in a range from 5 to 10 mm, for example.

The four annular land regions 4 are an outboard middle land region 11, an inboard middle land region 12, an outboard shoulder land region 13, an inboard shoulder land region 14. The outboard middle land region 11 is defined between the outboard shoulder main groove 5 and the crown main groove 7. The inboard middle land region 12 is defied between the inboard shoulder main groove 6 and the crown main groove 7.

The outboard shoulder land region 13 is defined between the outboard shoulder main groove 5 and the outboard tread edge Te1. The inboard shoulder land region 14 is defined between the inboard shoulder main groove 6 and the inboard tread edge Te2.

In a tread portion composed of four land regions as in the present invention, a large ground pressure is exerted on the outboard middle land region during straight running and cornering.

Figure 2:
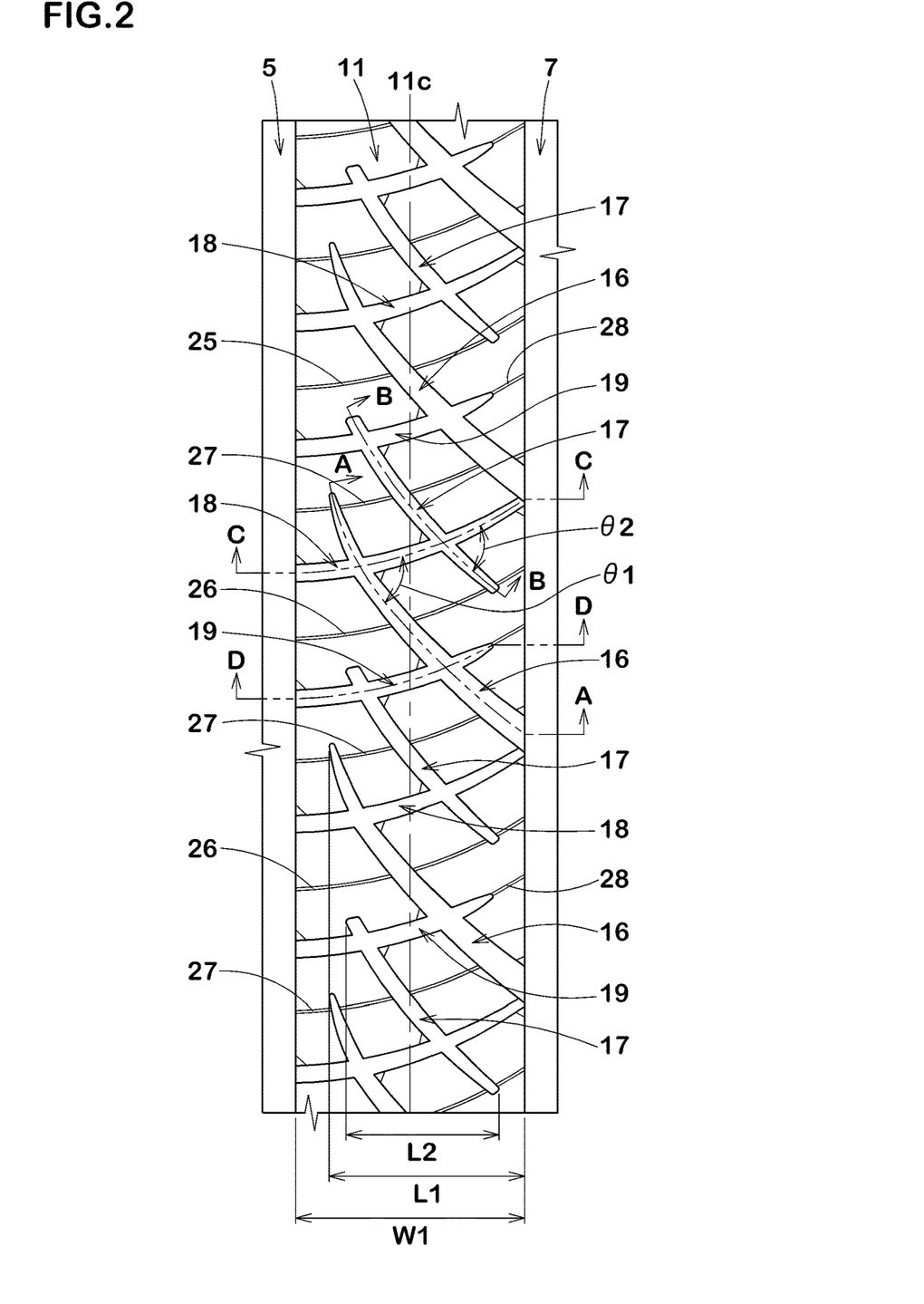
FIG. 2 is a partial top view of the outboard middle land region of FIG. 1.

FIG. 2 shows a part of the outboard middle land region 11. As shown in FIG. 1 and FIG. 2, in the present embodiment, the axial width W1 of the outboard middle land region 11 is the largest among the four land regions 4 so the outboard middle land region 11 is provided with high rigidity. Therefore, the outboard middle land region 11 helps to improve the steering stability on dry road surfaces.

Preferably, the axial width W1 of the outboard middle land region 11 is set in a range from 0.25 to 0.35 times the tread width TW, for example.

As shown in FIG. 2, the outboard middle land region 11 is provided with first inclined grooves 16, second inclined grooves 17, and third inclined grooves 18.

The first inclined grooves 16 and second inclined grooves 17 are inclined to a first direction with respect to the tire axial direction (in FIG. 2, inclined downward to the right).

The third inclined grooves 18 are inclined to a second direction, which is opposite to the first direction, with respect to the tire axial direction (in FIG. 2, inclined upward to the right).

Since a large contact pressure acts on the outboard middle land region 11, each inclined groove provided in this land region 11 can exert a large shearing force with snow block (snow column) compressed into the groove when running on snow.

Preferably, the first inclined grooves 16, the second inclined grooves 17, and the third inclined grooves 18 in the present embodiment are each curved. The widthwise center line of each inclined groove 16, 17, 18 is preferably curved along an arc of a radius of curvature of 30 mm or more, for example.

Each of the first inclined grooves 16 extends from the crown main groove 7 and is terminated within the outboard middle land region 11.

Each of the second inclined grooves 17 has its both ends terminated within the outboard middle land region 11.

The first inclined grooves 16 and the second inclined grooves 17 can improve the performance on snow, while maintaining the rigidity of the outboard middle land region 11 and maintaining the steering stability on dry road surfaces.

At least one of, preferably each of, the third inclined grooves 18 intersects one of the first inclined grooves 16 and one of the second inclined grooves 17 as shown in FIG. 2.

When running on snow, such intersecting third inclined groove 18 can strongly compact the snow at its portions connected to the first inclined groove 16 and the second inclined groove 17, and can further enhance the performance on snow.

In the present embodiment, the first inclined grooves 16 extend across the axial or widthwise center line 11c of the outboard middle land region 11.

Preferably, the axial length L1 of each of the first inclined grooves 16 is set in a range from 0.80 to 0.90 times the axial width W1 of the outboard middle land region 11.

The first inclined grooves 16 are each curved so that the widthwise center line protrudes toward one side in the tire circumferential direction (downward in FIG. 2) from a straight line drawn between both ends of the widthwise center line.

It is preferable that the angle of the widthwise center line of the first inclined groove 16 with respect to the tire circumferential direction is gradually decreased from the crown main groove 7 toward the outboard shoulder main groove 5. Preferably, the angle of the widthwise center line of the first inclined groove 16 is set in a range from 30 to 70 degrees with respect to the tire circumferential direction.

It is preferable that the groove width of the first inclined groove 16 decreases from the crown main groove 7 toward the outboard shoulder main groove 5. Such first inclined grooves 16 help to maintain the rigidity of the outboard middle land region 11.

Figure 3:
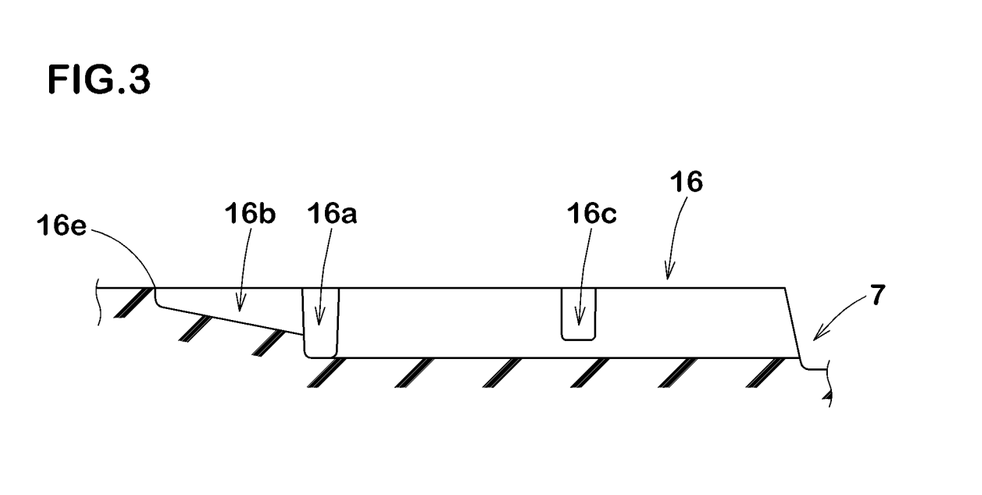
FIG. 3 is a cross sectional view taken along line A-A of FIG. 2.

FIG. 3 is a cross sectional view of the first inclined groove 16 taken along line A-A of FIG. 2 (widthwise center line).

It is preferable that, as shown in FIG. 3, an end portion 16b on the outboard shoulder main groove 5 side (left side in the figure) of the first inclined groove 16 is smaller in depth than other portion of the first inclined groove 16. Thereby, the rigidity of the outboard middle land region 11 near the end portion (axially outer end portion) is maintained, and the steering stability on dry road surfaces is improved.

As shown in FIG. 3, the first inclined groove 16 comprises
a communicating part 16a connected to the third inclined groove 18,
an outer part 16b extending from the communicating part 16a to the end 16e on the outboard shoulder main groove 5 side of the first inclined groove 16, and
a main part 16c on the crown main groove 7 side of the communicating part 16a.

Preferably, the depth of the first inclined groove 16 is smaller in the outer part 16b than its other part.

In this example, the outer part 16b has a bottom surface inclined with respect to the tire axial direction, so the depth of the outer part 16b gradually decreases toward the end 16e on the outboard shoulder main groove 5 side. Such first inclined grooves 16 help to improve the steering stability on dry road surfaces.

In the present embodiment, the first inclined grooves 16 and the second inclined grooves 17 are arranged alternately in the tire circumferential direction as shown in FIG. 2.

Preferably, the second inclined grooves 17 extend across the axial or widthwise center line 11c of the outboard middle land region 11.

It is preferable that the axial length L2 of the second inclined groove 17 is smaller than the axial length L1 of the first inclined groove 16. Preferably, the axial length L2 of the second inclined groove 17 is set in a range from 0.60 to 0.75 times the axial width W1 of the outboard middle land region 11. Such second inclined grooves 17 help to improve on-snow performance and the steering stability on dry road surfaces in a well-balanced manner.

It is preferable that the second inclined grooves 17 are curved in the same direction as the first inclined grooves 16. Preferably, the angle of the widthwise center line of the second inclined groove 17 with respect to the tire circumferential direction is gradually decreased toward the outboard shoulder main groove 5. And the angle is preferably set in a range from 30 to 70 degrees.

Preferably, the groove width of the second inclined groove 17 decreases from its outboard shoulder main groove 5 side to its the crown main groove 7 side.

Preferably, the end portion on the crown main groove 7 side of the second inclined groove 17 is smaller in depth than its other portion.

Such second inclined grooves 17 help to improve on-snow performance and the steering stability on dry road surfaces in a well-balanced manner.

Figure 4:
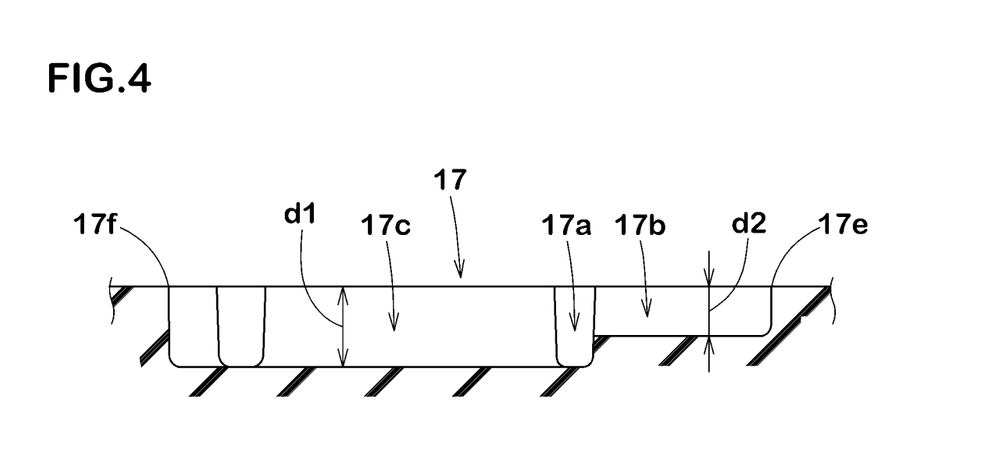
FIG. 4 is a cross sectional view taken along line B-B of FIG. 2.

FIG. 4 is a cross sectional view of the second inclined groove 17 taken along line B-B of FIG. 2 (widthwise center line).

As shown in FIG. 4, the second inclined groove 17 comprises
a communicating part 17a connected to the third inclined groove 18,
an inner part 17b extending from the communicating part 17a to the end 17e on the crown main groove 7 side of the second inclined groove 17, and
a main part 17c extending from the communication portion 17a to the end 17f on the outboard shoulder main groove 5 side of the second inclined groove 17.

The inner part 17b has a constant depth d2 along the length direction of the second inclined groove 17.

The inner part 17b preferably has a smaller depth than other part of the second inclined groove 17.

Specifically, the depth d2 of the inner part 17b is in a range from 0.40 to 0.80 times the depth d1 of the main part 17c. Such second inclined grooves 17 help to improve the performance on snow and the steering stability on dry road surfaces in a well-balanced manner.

In the present embodiment, as shown in FIG. 2, the third inclined grooves 18 extend from the outboard shoulder main groove 5 to end portions on the crown main groove 7 side of the respective first inclined grooves 16.

Thus, each of the third inclined grooves 18 extends across the widthwise center line 1c of the outboard middle land region 11, and across one of the first inclined grooves 16 and one of the second inclined grooved 17.

The third inclined grooves 18 are each curved so that the widthwise center line protrudes toward one side in the tire circumferential direction from a straight line drawn between both ends of the widthwise center line.

The angle of the widthwise center line of the third inclined groove 18 with respect to the tire circumferential direction gradually decreases toward the crown main groove 7.

Preferably, the angle of the third inclined groove 18 is set in a range from 60 to 85 degrees with respect to the tire circumferential direction.

Preferably, the intersecting angle θ1 between the widthwise center lines of the first inclined groove 16 and the third inclined groove 18 is set in a range from 50 to 90 degrees.

Preferably, the intersecting angle θ2 between the widthwise center lines of the second inclined groove 17 and the third inclined groove 18 is set in a range from 50 to 90 degrees. As a result, the snow is strongly compacted at the intersections of the inclined grooves, and the compacted snow block (snow column) can exert a large shearing force to improve the performance on snow.

Preferably, the groove width of each of the third inclined grooves 18 is gradually decreased at least from the intersecting first inclined groove 16 to the intersecting second inclined groove 17.

More preferably, the groove width of the third inclined groove 18 is gradually decreased from the outboard shoulder main groove 5 to the end on the crown main groove 7 side of the third inclined groove 18.

Thereby, the performance on snow is improved, while the rigidity of the outboard middle land region 11 is maintained.

Figure 5:
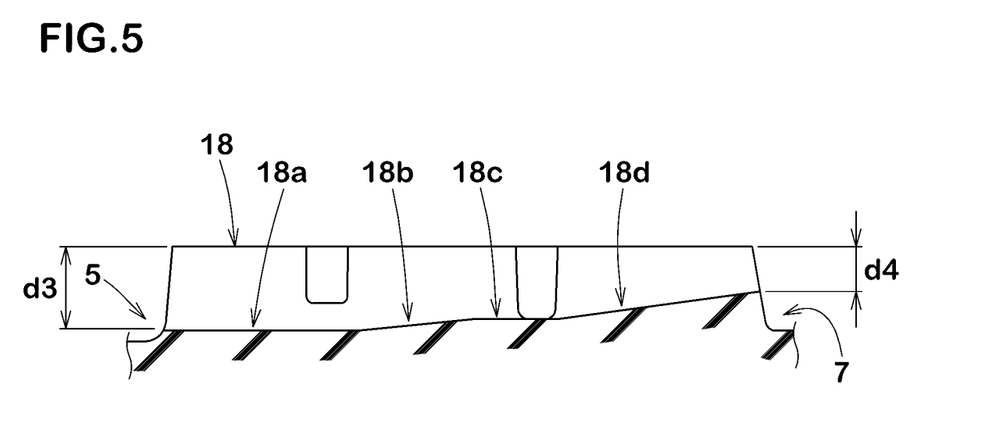
FIG. 5 is a cross sectional view taken along line C-C of FIG. 2.

FIG. 5 is a cross sectional view of the third inclined groove 18 taken along line c-c of FIG. 2 (widthwise center line). As shown in FIG. 5, preferably, the depth of the third inclined groove 18 is gradually increased from its end on the crown main groove 7 side to its end on the outboard shoulder main groove 5 side.

In this example, the third inclined groove 18 comprises:
a first constant depth portion 18a having a constant depth along its length;
a second constant depth portion 18c having a constant depth along its length which depth is smaller than the first constant depth portion 18a;
a first variable depth portion 18b whose bottom surface is inclined with respect to the tire axial direction to have a depth varied between the above-said constant depths; and
a second variable depth portion 18d whose bottom surface is inclined with respect to the tire axial direction to have a depth gradually decreased from the second constant depth portion 18c depth.

The first constant depth portion 18a is connected to the outboard shoulder main groove 5.

The second constant depth portion 18c is disposed on the crown main groove 7 side of the first constant depth portion 18a. The first variable depth portion 18b is disposed between the first constant depth portion 18a and the second constant depth portion 18c.

The second variable depth portion 18d is disposed on the crown main groove 7 side of the second constant depth portion 18c.

The third inclined groove 18 has a maximum depth d3 and a minimum depth d4.

The maximum depth d3 occurs in the first constant depth portion 18a.

The minimum depth d4 occurs at the terminal end of the second variable depth portion 18d.

Preferably, the minimum depth d4 is in a range from 0.40 to 0.60 times the maximum depth d3.

Such third inclined grooves 18 can enhance the performance on snow and the steering stability on dry road surfaces in a well-balanced manner.

In the present embodiment, the outboard middle land region 11 is further provided with fourth inclined grooves 19 as shown in FIG. 2.

The fourth inclined grooves 19 extend from the outboard shoulder main groove 5, while inclining to the above-said second direction with respect to the tire axial direction, and are terminated within the outboard middle land region 11. Each of the fourth inclined grooves 19 extends across the widthwise center line 11c of the outboard middle land region 11, and across one of the first inclined grooves 16 and one of the second inclined grooved 17.

The fourth inclined grooves 19 are curved in the same direction as the third inclined grooves 18. Preferably, the widthwise center line of each of the fourth inclined grooves 19 is curved along an arc of a radius of curvature of 30 mm or more, for example.

The third inclined grooves and the fourth inclined grooves 19 are arranged alternately in the tire circumferential direction.

The axial length of each of the fourth inclined grooves 19 is smaller than the axial length of the third inclined grooves 18.

The angle of each of the fourth inclined grooves 19 (of the widthwise center line) with respect to the tire circumferential direction is gradually decreased toward the crown main groove 7. And the angle is set within a range from 60 to 85 degrees, for example. Such fourth inclined grooves 19 help to enhance the traction and cornering performance on snow.

Figure 6:
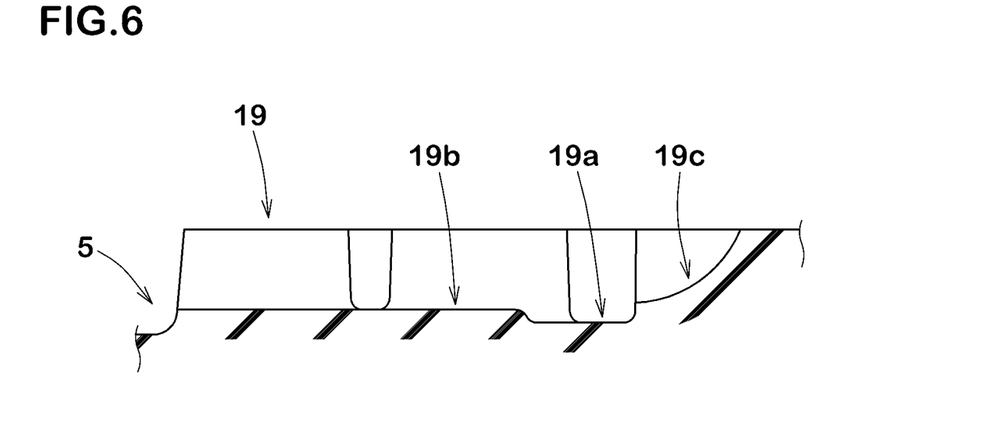
FIG. 6 is a cross sectional view taken along line D-D of FIG. 2.

FIG. 6 is a cross sectional view of the fourth inclined groove 19 taken along line D-D of FIG. 2 (widthwise center line). As shown in FIG. 6, the fourth inclined groove 19 comprises:
a communicating part 19a connected to the first inclined groove 16,
a main part 19b between the communicating part 19a and the outboard shoulder main groove 5, and
an end part 19c on the crown main groove 7 side of the communicating part 19a.

The main part 19b has a depth which is constant along its length. The bottom surface of the end part 19c is curved so that the groove depth is gradually decreased toward the crown main groove 7. For example, the bottom surface of the end part 19c has a radius of curvature of 10 to 30 mm in the cross sectional view. Such end parts 19c of the fourth inclined grooves 19 helps to maintain the rigidity of the outboard middle land region 11, thereby improving the steering stability on dry road surfaces.

The outboard middle land region 11 in the present embodiment is preferably provided with sipes 25 in order to improve wet performance, snow performance and the like.

The term "sipe" means a narrow groove having a groove width of not more than 1.5 mm inclusive of a cut having no substantial groove width.

In the present embodiment, the sipes 25 preferably have a width of from 0.4 to 1.0 mm, for example.

In the present embodiment, the sipes 25 are inclined to the above-said second direction with respect to the tire axial direction as shown in FIG. 2.

Such sipes 25 generate frictional forces by their edges, while maintaining the rigidity of the outboard middle land region 11.

Preferably, the sipes 25 are convexly curved in the same direction as the third inclined grooves 18.

In the present embodiment, the curved sipes 25 include first sipes 26 and second sipes 27.

The first sipes 26 extend from the outboard shoulder main groove 5 to the crown main groove 7. Each of the first sipes 26 crosses one of the first inclined grooves 16 and an end portion on the crown main groove 7 side of one of the second inclined grooves 17.

The second sipes 27 extend from the outboard shoulder main groove 5 to the respective first inclined grooves 16 to terminate thereat. Each of the second sipes 27 crosses one of the second inclined grooves 17 and an end portion on the outboard shoulder main groove 5 side of one of the first inclined grooves 16.

Such first sipes 26 and second sipes 27 can prevent snow from clogging the ends of the first inclined groove 16 and the second inclined groove 17. Thus, excellent on-snow performance can be exhibited over a long period of time.

The sipes 25 further include third sipes 28 extending from ends on the crown main groove 7 side of the respective fourth inclined grooves 19 to the crown main groove 7. such third sipes 28 help to prevent snow from clogging the ends of the fourth inclined grooves 19.

Figure 7:
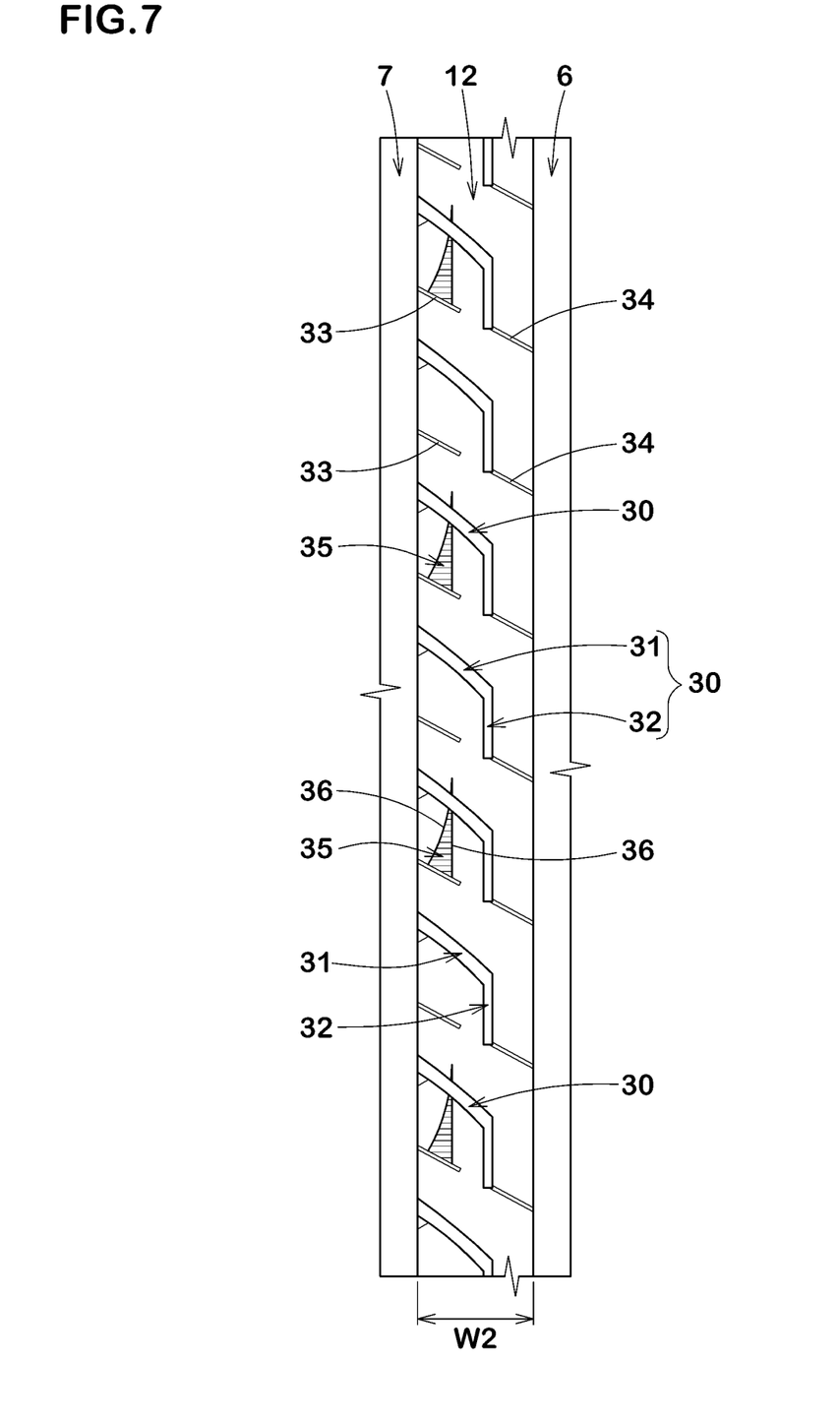
FIG. 7 is a partial top view of the inboard middle land region of FIG. 1.

FIG. 7 shows a part of the inboard middle land region 12. Preferably, the axial width w2 of the inboard middle land region 12 is smaller than the axial width W1 of the outboard middle land region 11, and preferably set in a range from 0.10 to 0.20 times the tread width TW.

The inboard middle land region 12 is provided with middle lateral grooves 30. The middle lateral grooves 30 extend from the crown main groove 7 and terminate within the inboard middle land region 12.

Each of the middle lateral grooves 30 comprises:
a first part 31 extending from the crown main groove 7 and inclined to the above-said first direction with respect to the tire axial direction, and
a second part 32 extending from the first part 31 in substantially parallel with the tire circumferential direction.

When running on snow, the middle lateral grooves 30 can exert large shearing force in the tire circumferential direction and also in the tire axial direction by the compacted snow (snow column).

The inboard middle land region 12 is further provided with first middle sipes 33 and second middle sipes 34.

The first middle sipes 33 extend from the crown main groove 7 and terminate within the inboard middle land region 12.

The second middle sipes 34 extend from the respective middle lateral grooves 30 to the inboard shoulder main groove 6.

As shown in FIG. 7, the inboard middle land region 12 is provided with a sipe combination 35 made up of two sipes 36 and multiple cuts extending between the two sipes 36.

The two sipes 36 in this example extend from one of the first middle sipes 33 to the first part 31 of one of the middle lateral grooves 30, while gradually decreasing the distance therebetween.

Such sipe combination 35 helps to improve grip performance at the start of use of the tire.

In this example, the sipe combination 35 is provided for every other first middle sipe 33 as shown in FIG. 7.

Figure 8:
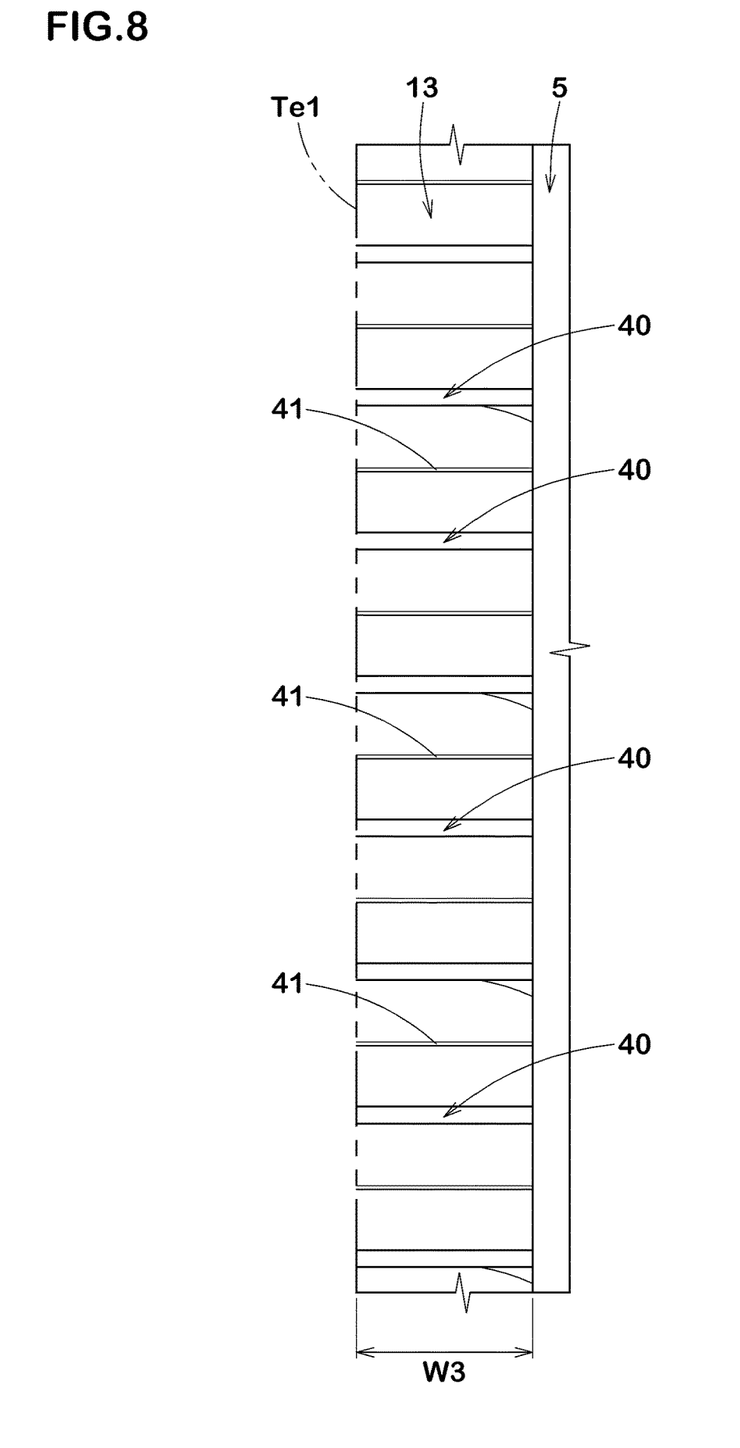
FIG. 8 is a partial top view of the outboard shoulder land region of FIG. 1.

FIG. 8 shows a part of the outboard shoulder land region 13.

The axial width 3 of the outboard shoulder land region 13 is preferably larger than the axial width w2 of the inboard middle land region 12. Preferably, the axial width 3 is set in a range from 0.15 to 0.25 times the tread width TW, for example.

The outboard shoulder land region 13 is provided with shoulder lateral grooves 40 extending in the tire axial direction, and shoulder sipes 41 extending in the tire axial direction. Such shoulder lateral grooves 40 and shoulder sipes 41 help to improve the performance on snow.

As shown in FIG. 1, the inboard shoulder land region 14 is also provided with shoulder lateral grooves 40 extending in the tire axial direction, and shoulder sipes 41 extending in the tire axial direction.

Preferably, the inboard shoulder land region 14 is provided with a chamfer 42 extending between the ground contacting top surface of the inboard shoulder land region 14 (constituting a part of tread surface), and the side surface on the inboard shoulder main groove 6 side of the inboard shoulder land region 14.

Preferably, the chamfer 42 is provided with narrow grooves (not shown) extending from the tread surface to the above-said side surface. Thereby, grip performance on snow can be further improved.

While detailed description has been made of a preferable embodiment of the present invention, the present invention can be embodied in various forms without being limited to the illustrated embodiment.

Comparison Test 1

Figure 9:
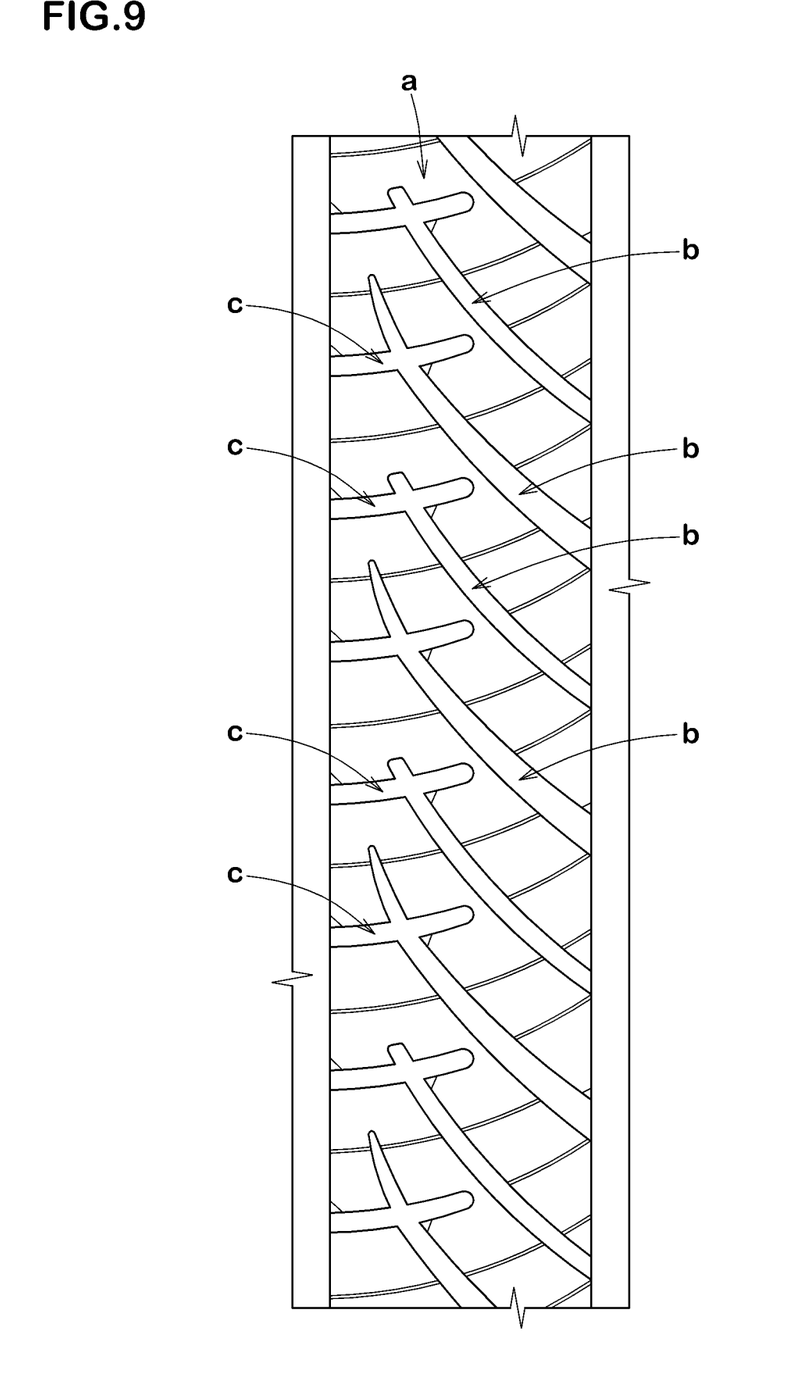
FIG. 9 is a partial top view of an outboard middle land region of a comparative example tire.

Pneumatic tires of size 215/60R16 were experimentally manufactured as test tires including:
embodiment tires (Ex. 1-Ex. 9) having tread patterns based on the tread pattern shown in FIG. 1; and
a comparative example tire (com) having a tread pattern substantially the same as that shown in FIG. 1 except that, as shown in FIG. 9, an outboard middle land region (a) was provided with inclined grooves (b) extending from the crown main groove and terminated within the outboard middle land region (a), and inclined grooves (c) each communicating with one inclined groove (b) only, and grooves corresponding to the second inclined grooves and the third inclined grooves of the present invention were not provided.

Each test tire was tested for snow performance and steering stability on dry road surfaces as follows, using a 2500 cc front wheel drive passenger car as a test car where the test tires were mounted on standard wheel rims of size 16×6.5 and inflated to 240 kPa.

<Snow Performance>

Snow performance of each test tire when the test car was running on a snowy road was evaluated by the test driver.

The results are shown in Table 1 by an index based on the comparative example being 100, wherein the larger the numerical value, the better the snow performance.

<Steering Stability on Dry Road Surfaces>

Steering stability when the test car was running on a dry road surface was evaluated by the test driver.

The results are shown in Table 1 by an index based on the comparative example being 100, wherein the larger the numerical value, the better the steering stability on dry road surfaces.

TABLE 1

| Tire | Com | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| outboard middle land region (FIG. No.) | 9 | 2 | 2 | 2 | 2 | 2 | 2 | 2 | 2 | 2 |
| W1/TW | 0.30 | 0.30 | 0.25 | 0.28 | 0.32 | 0.35 | 0.30 | 0.30 | 0.30 | 0.30 |
| L1/W1 | — | 0.85 | 0.85 | 0.85 | 0.85 | 0.85 | 0.80 | 0.90 | 0.85 | 0.85 |
| L2/W1 | — | 0.68 | 0.68 | 0.68 | 0.68 | 0.68 | 0.68 | 0.68 | 0.60 | 0.75 |
| snow performance | 100 | 105 | 105 | 105 | 105 | 103 | 104 | 105 | 103 | 105 |
| steering stability | 100 | 103 | 101 | 102 | 103 | 102 | 103 | 102 | 103 | 102 |

From the test results, it was confirmed that the embodiment tires exhibited excellent snow performance and steering stability on dry road surfaces.

Comparison Test 2

Pneumatic tires of size 215/60R16 were experimentally manufactured as test tires including:

embodiment tires (Ex. 10-Ex. 18) having tread patterns based on the tread pattern shown in FIG. 1, and a reference example tire (Ref) having a tread pattern substantially same as that shown in FIG. 1 except that the depth of each second inclined groove was constant along its length and the same as the depth of the main parts of the second inclined grooves.

Each test tire was tested for snow performance and steering stability on dry road surfaces in the same manner as described above.

The test results are shown in Table 2 by an index based on the reference example tire being 100, wherein the larger the numerical value, the better the performance.

TABLE 2

| Tire | Ref | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| W1/TW | 0.30 | 0.30 | 0.25 | 0.28 | 0.32 | 0.35 | 0.30 | 0.30 | 0.30 | 0.30 |
| d2/d1 | — | 0.62 | 0.62 | 0.62 | 0.62 | 0.62 | 0.40 | 0.50 | 0.70 | 0.80 |
| snow performance | 100 | 102 | 104 | 103 | 102 | 101 | 101 | 102 | 102 | 101 |
| steering stability | 100 | 105 | 103 | 104 | 105 | 105 | 106 | 105 | 104 | 103 |

From the test results, it was confirmed that the embodiment tires exhibited excellent snow performance and steering stability on dry road surfaces as compared with the reference example tire.

DESCRIPTION OF THE REFERENCE SIGNS 2 tread portion
3 main groove
4 land region
5 outboard shoulder main groove
7 crown main groove
11 outboard middle land region
16 first inclined groove
17 second inclined groove
18 third inclined groove
Te1 outboard tread edge
Te2 inboard tread edge

The invention claimed is:

1. A tire comprising:
a tread portion having an outboard tread edge and an inboard tread edge to be located outboard and inboard of the vehicle, respectively, wherein
the tread portion is provided, between the inboard tread edge and the outboard tread edge, with three main grooves extending continuously and circumferentially of the tire so that the tread portion is axially divided into four land regions,
the three main grooves include
an outboard shoulder main groove disposed between the outboard tread edge and the tire equator, and
a crown main groove disposed adjacently to the outboard shoulder main groove on the inboard tread edge side of the outboard shoulder main groove,
the four land regions include an outboard middle land region defined between the outboard shoulder main groove and the crown main groove,
the axial width of the outboard middle land region is the largest among the four land regions,
the outboard middle land region is provided with first inclined grooves, second inclined grooves, third inclined grooves, and fourth inclined grooves,
the first inclined grooves and the second inclined grooves are arranged alternately in the circumferential direction,
each of the first inclined grooves has an inboard end that opens into the crown main groove, and an outboard end that is closed within the outboard middle land region, and extends from its inboard end to outboard end while curving toward one side in the tire circumferential direction,
each of the second inclined grooves has an inboard end on the crown main groove side that is closed within the outboard middle land region, and an outboard end on the outboard shoulder main groove side that is closed in the outboard middle land region, and extends from its inboard end to outboard end while curving toward said one side in the tire circumferential direction,
the third inclined grooves and the fourth inclined grooves are arranged alternately in the circumferential direction,
each of the third inclined grooves has an outboard end that opens into the outboard shoulder main groove, and an inboard end that is adjacent to the crown main groove, and extends from its outboard end to inboard end while curving toward said one side in the tire circumferential direction,
each of the fourth inclined grooves has an outboard end that opens into the outboard shoulder main groove, and an inboard end on the crown main groove side, and extends from its outboard end to inboard end while curving toward said one side in the tire circumferential direction,
each of the second inclined grooves crosses one of the third inclined grooves and one of the fourth inclined grooves that is adjacent to said one of the third inclined grooves on said one side in the tire circumferential direction, and
each of the first inclined grooves crosses one of the fourth inclined grooves and one of the third inclined grooves that is adjacent to said one of the fourth inclined grooves on said one side in the tire circumferential direction.

2. The tire according to claim 1, wherein the groove width of each of the first inclined grooves decreases from the crown main groove toward the outboard shoulder main groove.

3. The tire according to claim 1, wherein the groove width of each of the second inclined grooves decreases from the outboard shoulder main groove side to the crown main groove side.

4. The tire according to claim 1, wherein
each of the third inclined grooves intersects one of the first inclined grooves and one of the second inclined grooves, and the groove width of each of the third inclined grooves gradually decreases at least from said one of the first inclined grooves to said one of the second inclined grooves.

5. The tire according to claim 1, wherein
the groove width of each of the first inclined grooves decreases from the crown main groove toward the outboard shoulder main groove, and
the groove width of each of the second inclined grooves decreases from the outboard shoulder main groove side to the crown main groove side.

6. The tire according to claim 1, wherein
the groove width of each of the first inclined grooves decreases from the crown main groove toward the outboard shoulder main groove,
the groove width of each of the second inclined grooves decreases from the outboard shoulder main groove side to the crown main groove side,
each of the third inclined grooves intersects one of the first inclined grooves and one of the second inclined grooves, and
the groove width of each of the third inclined grooves gradually decreases at least from said one of the first inclined grooves to said one of the second inclined grooves.

7. The tire according to claim 1, wherein the depth of each of the first inclined grooves is smaller in its outboard end portion on the outboard shoulder main groove side than its other portion.

8. The tire according to claim 1, wherein the depth of each of the second inclined grooves is smaller in its inboard end portion on the crown main groove side than its other portion.

9. The tire according to claim 1, wherein the axial width of the outboard middle land region is in a range from 0.25 to 0.35 times the tire tread width between the outboard tread edge and the inboard tread edge.

10. The tire according to claim 1, wherein the depth of each of the third inclined grooves gradually increases from its inboard end on the crown main groove side to its outboard end on the outboard shoulder main groove side.

11. The tire according to claim 1, wherein
each of the second inclined grooves comprises a communicating part connected to one of the third inclined grooves, and an inner part extending from the communicating part to the inboard end on the crown main groove side of the second inclined groove, and
the depth of each of the second inclined grooves is smaller in the inner part than other part of the second inclined groove.

12. The tire according to claim 1, wherein
each of the first inclined grooves comprises a communicating part connected to one of the third inclined grooves, and an outer part extending from the communicating part to the outboard end on the outboard shoulder main groove side of the first inclined groove, and
the depth of each of the first inclined grooves is smaller in the outer part than its other part.

13. The tire according to claim 12, wherein the depth of the outer part gradually decreases toward the outboard end on the outboard shoulder main groove side of the first inclined groove.

14. The tire according to claim 1, wherein the axial length of each of the second inclined grooves is in a range from 0.60 to 0.75 times the axial width of the outboard middle land region.

15. The tire according to claim 1, wherein
the three main grooves are the outboard shoulder main groove, the crown main groove, and an inboard shoulder main groove,
the four land regions include an inboard middle land region defied between the inboard shoulder main groove and the crown main groove, and
the axial width of the inboard middle land region is in a range from 0.10 to 0.20 times the tire tread width between the outboard tread edge and the inboard tread edge.

16. The tire according to claim 15, wherein
the outboard shoulder main groove is disposed on the outboard tread edge side of the tire equator, and
the crown main groove and the inboard shoulder main groove are disposed on the inboard tread edge side of the tire equator.

17. The tire according to claim 1, wherein the axial length of each of the second inclined grooves is smaller than the axial length of each of the first inclined grooves.

18. The tire according to claim 1, wherein the inboard end of each of the third inclined grooves is connected to an inboard end portion of one of the first inclined grooves.

19. The tire according to claim 1, wherein
the outboard middle land region is provided with first sipes, and
each of the first sipes
is arranged between one of the fourth inclined grooves and one of the third inclined grooves that is adjacent to said one of the fourth inclined grooves on said one side in the tire circumferential direction,
extends from the outboard shoulder main groove to the crown main groove while curving toward said one side in the tire circumferential direction, and
intersects one of the first inclined grooves and one of the second inclined grooves.

20. The tire according to claim 19, wherein
the outboard middle land region is provided with second sipes, and
each of the second sipes
is arranged between one of the third inclined grooves and one of the fourth inclined grooves that is adjacent to said one of the third inclined grooves on said one side in the tire circumferential directions,
extends from the outboard shoulder main groove to one of the first inclined grooves while curving toward said one side in the tire circumferential direction, and
intersects another one of the first inclined grooves and one of the second inclined grooves.

* * * * *